Patented June 11, 1940

2,204,201

UNITED STATES PATENT OFFICE 2,204,201

ACID DYESTUFFS OF THE INDOLYLDIPHENYL-METHANE SERIES

Paul Wolff and Emil Beniers, Frankfort-on-the-Main, Germany, assignors to General Aniline & Film Corporation, a corporation of Delaware No Drawing. Application May 13, 1938, Serial No. 207,789. In Germany May 25, 1937

3 Claims. (Cl. 260—319)

It is known that halogen atoms in triphenyl-methane-dyestuffs, standing in para-position to the methane carbon atom may undergo exchange with primary aromatic amines, and it is further known that the fastness to light of such dyestuffs is essentially improved when there is used in this reaction a primary aromatic amine containing, in para-position to the amino group, an alkoxy group. It has, however, been found that the fastness to alkalies of such dyestuffs, containing in this manner a secondary diphenylamino radical in the molecule, is considerably reduced.

Now, we have found that acid dyestuffs of the diindolylphenylmethane and indolyldiphenyl-methane series of very good fastness to light and an essentially improved fastness to alkalies may generally be obtained by causing a basic or acid dyestuff of the said series containing a halogen atom in para-position to the methane carbon atom to react with a 1-monoalkylamino-4-alkoxybenzene compound and sulfonating the dyestuff obtained in case it is basic.

The following examples serve to illustrate the invention, but they are not intended to limit it thereto:

1. The product obtainable by condensing 4.4'-dichlorobenzophenone with 1-isobutyl-2-para-chlorophenyl-4.6-dimethylindole is melted at 120° C., for several hours, for instance for three hours, with an excess of 1-methylamino-4-methoxybenzene and the basic blue dyestuff thus obtained is purified by stirring the pulverized mass with dilute hydrochloric acid. By sulfonating the dyestuff, at ordinary temperature, by means of concentrated sulfuric acid to form the di-sulfonic acid, a dyestuff is obtained which dyes wool and silk greenish-blue tints. The dyestuff probably corresponds with the following formula:

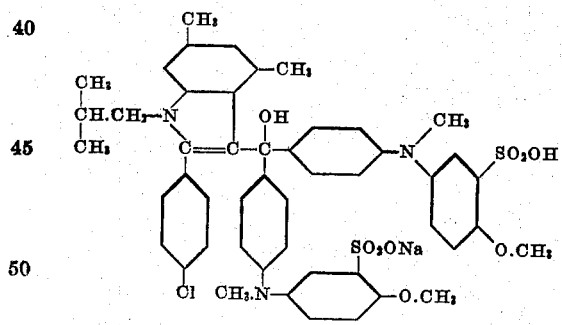

2. The product obtainable, as indicated in Example 1, by condensing 4.4'-dichlorobenzophenone with 1-isobutyl-2-para-chlorophenyl-4.6-dimethyl indole is heated, for about 6 hours and at a temperature of about 100° C., in the presence of aqueous pyridine, with an excess of 1-methylamino-4-ethoxybenzene-sulfonic acid (obtainable by sulfonating 1-methylamino-4-ethoxybenzene, at 100° C.–120° C., with three times its weight of concentrated sulfuric acid), until the whole no longer turns blue. The acid dyestuff thus obtained dyes wool and silk blue tints.

3. The disulfonic acid obtainable by condensing in chlorosulfonic acid, in the presence of fuming sulfuric acid containing 5% of sulfuric anhydride, 1-isobutyl-2-parachlorophenyl-4.6-dimethylindole with 4-chlorobenzophenone-2'-sulfonic acid (obtainable by condensation of ortho-sulfobenzoic anhydride with chlorobenzene, in the presence of aluminium chloride according to Friedel-Craft's reaction) is melted, for one hour, with an excess of 1-methylamino-4-methoxybenzene, at a temperature of about 75° C. The dyestuff, which has in the usual manner been freed from the unconsumed base by stirring the pulverized mass with dilute hydrochloric acid, dyes wool and silk clear green tints which are very fast to alkalies. The dyestuff probably has the following formula:

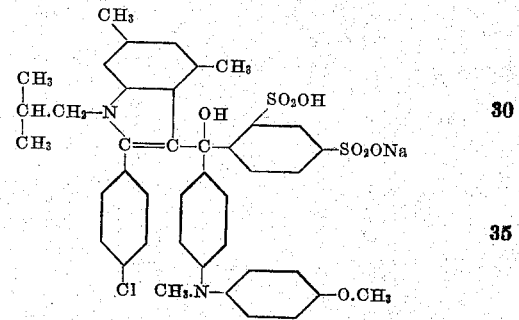

We claim:
1. The compounds of the general formula:

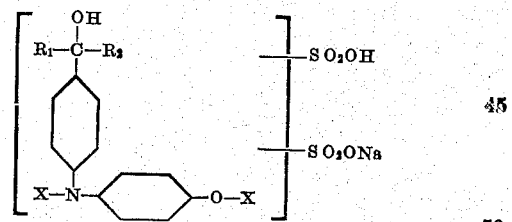

wherein X represents an alkyl of the group consisting of methyl and ethyl, $R_1$ is a radical selected from the class consisting of sulfonated phenyl and sulfonated -N-alkyl-diphenylamine radicles, and $R_2$ is an N-alkyl-indole radical which is substituted in alpha-position by a phenyl radicle and is bound in its beta-position to the methane carbon atom of the compound, said compounds being acid dyestuffs yielding tints of good fastness properties.

2. The compound of the formula:

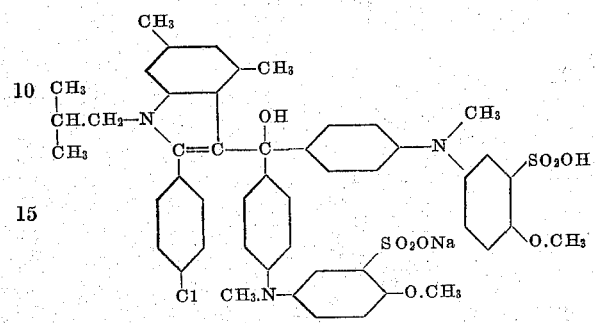

being a dyestuff which dyes wool and silk greenish-blue tints.

3. The compound of the formula:

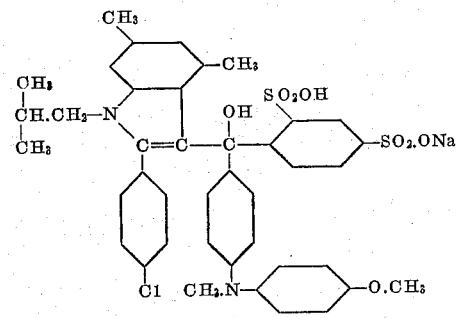

being a dyestuff which dyes wool and silk clear green tints of good fastness to alkalies.

PAUL WOLFF.
EMIL BENIERS.